United States Patent
Feldman et al.

(10) Patent No.: US 10,902,582 B2
(45) Date of Patent: Jan. 26, 2021

(54) COMPUTERIZED SYSTEM AND METHOD FOR OBTAINING INFORMATION ABOUT A REGION OF AN OBJECT

(71) Applicant: Applied Materials Israel, Ltd., Revohot (IL)

(72) Inventors: Haim Feldman, Nof-Ayalon (IL); Eyal Neistein, Herzlyia (IL); Harel Ilan, Rehovot (IL); Shahar Arad, Holon (IL); Ido Almog, Rehovot (IL)

(73) Assignee: Applied Materials Israel, Ltd., Revohot (IL)

( * ) Notice: Subject to any disclaimer, the term of this patent is extended or adjusted under 35 U.S.C. 154(b) by 82 days.

(21) Appl. No.: 16/250,980

(22) Filed: Jan. 17, 2019

(65) Prior Publication Data
US 2020/0234418 A1    Jul. 23, 2020

(51) Int. Cl.
*G06T 7/00* (2017.01)
*G06T 7/11* (2017.01)

(52) U.S. Cl.
CPC ............... *G06T 7/001* (2013.01); *G06T 7/11* (2017.01); *G06T 7/97* (2017.01); *G06T 2207/20224* (2013.01); *G06T 2207/30148* (2013.01)

(58) Field of Classification Search
CPC ... G06T 7/001; G06T 7/97; G06T 7/11; G06T 2207/20224; G06T 2207/30148
See application file for complete search history.

(56) References Cited

U.S. PATENT DOCUMENTS

| | | | |
|---|---|---|---|
| 9,625,726 B2 | 4/2017 | Chen | |
| 9,880,107 B2 | 1/2018 | Chen et al. | |
| 2012/0141012 A1* | 6/2012 | Sakai | G06T 7/001 382/149 |
| 2012/0229618 A1* | 9/2012 | Urano | G06T 7/0004 348/92 |
| 2017/0148226 A1* | 5/2017 | Zhang | G06T 9/00 |
| 2019/0238796 A1* | 8/2019 | Allen | G06T 7/0008 |

FOREIGN PATENT DOCUMENTS

| | | |
|---|---|---|
| KR | 10-2018-0102117 A | 9/2018 |
| WO | 2013155008 A1 | 10/2013 |

OTHER PUBLICATIONS

International Search Report and Written Opinion of International Application No. PCT/US2020/013555 dated May 6, 2020.

* cited by examiner

*Primary Examiner* — Yon J Couso
(74) *Attorney, Agent, or Firm* — Lowenstein Sandler LLP

(57) ABSTRACT

A method, system and computer readable medium for providing information about a region of a sample. The method includes (i) obtaining, by an imager, multiple images of the region; wherein the multiple images differ from each other by at least one parameter (ii) receiving or generating multiple reference images; (iii) generating multiple difference images that represent differences between the multiple images and the multiple reference images; (iv) calculating a set of region pixel attributes, (v) calculating a set of noise attributes, based on multiple sets of region pixels attributes of the multiple region pixels; and (vi) determining for each region pixel, whether the region pixel represents a defect based on a relationship between the set of noise attributes and the set of region pixel attributes of the pixel.

18 Claims, 8 Drawing Sheets

| 91 | 92 | 93 |
|---|---|---|
| 94 | 95 | 96 |
| 97 | 98 | 99 |

−

| 101 | 102 | 103 |
|---|---|---|
| 104 | 105 | 106 |
| 107 | 108 | 109 |

=

| 111 | 112 | 113 |
|---|---|---|
| 114 | 115 | 116 |
| 117 | 118 | 119 |

FIG. 7

COMPUTERIZED SYSTEM AND METHOD FOR OBTAINING INFORMATION ABOUT A REGION OF AN OBJECT

BACKGROUND OF THE INVENTION

As the design rule shrinks, wafer inspection tools are required to detect ever smaller defects. Previously, defect detection was limited mainly by laser power and detectors noise. In present day (and probably in future) tools, detection are frequently limited by light scattered by the roughness of the patterns printed on wafer and in particular by line edge roughness. These irregularities scatter light with random phases, which can combine to generate bright spots on the detector (speckles), almost undistinguishable from a real defect. Current filtering techniques are not effective in removing these speckles, as their shapes in the standard bright field or dark field channels are very similar to those of real defects.

There is a growing need to provide a reliable defect detection system.

SUMMARY

There may be provided a method for obtaining information about a region of a sample, the method may include (a) obtaining, by an imager, multiple images of the region; wherein the multiple images differ from each other by at least one parameter selected out of illumination spectrum, collection spectrum, illumination polarization, collection polarization, angle of illumination, angle of collection, and sensing type; wherein the obtaining of the multiple images comprises illuminating the region and collecting radiation from the region; wherein the region comprises multiple region pixels; (b) receiving or generating multiple reference images; (c) generating, by an image processor, multiple difference images that represent differences between the multiple images and the multiple reference images; (d) calculating a set of region pixel attributes for each region pixel of the multiple region pixels; wherein the calculating is based on pixels of the multiple difference images; (e) calculating a set of noise attributes, based on multiple sets of region pixels attributes of the multiple region pixels; and (f) determining for each region pixel, whether the region pixel represents a defect based on a relationship between the set of noise attributes and the set of region pixel attributes of the pixel.

There may be provided a computerized system for obtaining information about a region of a sample, the system may include an imager that comprises optics and an image processor; wherein the imager is configured to obtain multiple images of the region; wherein the multiple images differ from each other by at least one parameter selected out of illumination spectrum, collection spectrum, illumination polarization, collection polarization, angle of illumination, and angle of collection; wherein the obtaining of the multiple images comprises illuminating the region and collecting radiation from the region; wherein the region comprises multiple region pixels; wherein the computerized system is configured to receive or generate multiple reference images; wherein the image processor is configured to: generate multiple difference images that represent differences between the multiple images and the multiple reference images; calculate a set of region pixel attributes for each region pixel of the multiple region pixels; wherein the set of region pixel attributes are calculated based on pixels of the multiple difference images; calculate a set of noise attributes, based on multiple sets of region pixels attributes of the multiple region pixels; and determine, for each region pixel, whether the region pixel represents a defect based on a relationship between the set of noise attributes and the set of region pixel attributes of the pixel.

There may be provided a non-transitory computer-readable medium that may store instructions that cause a computerized system to obtain, by an imager of the computerized system, multiple images of a region of an object; wherein the multiple images differ from each other by at least one parameter selected out of illumination spectrum, collection spectrum, illumination polarization, collection polarization, angle of illumination, angle of collection, and sensing type; wherein the obtaining of the multiple images comprises illuminating the region and collecting radiation from the region; wherein the region comprises multiple region pixels; receive or generate multiple reference images; generate, by an image processor of the computerized system, multiple difference images that represent differences between the multiple images and the multiple reference images; calculate a set of region pixel attributes for each region pixel of the multiple region pixels; wherein the calculating is based on pixels of the multiple difference images; calculate a set of noise attributes, based on multiple sets of region pixels attributes of the multiple region pixels; and determine, for each region pixel, whether the region pixel represents a defect based on a relationship between the set of noise attributes and the set of region pixel attributes of the pixel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 illustrates an example of various images; and

Figure 1:
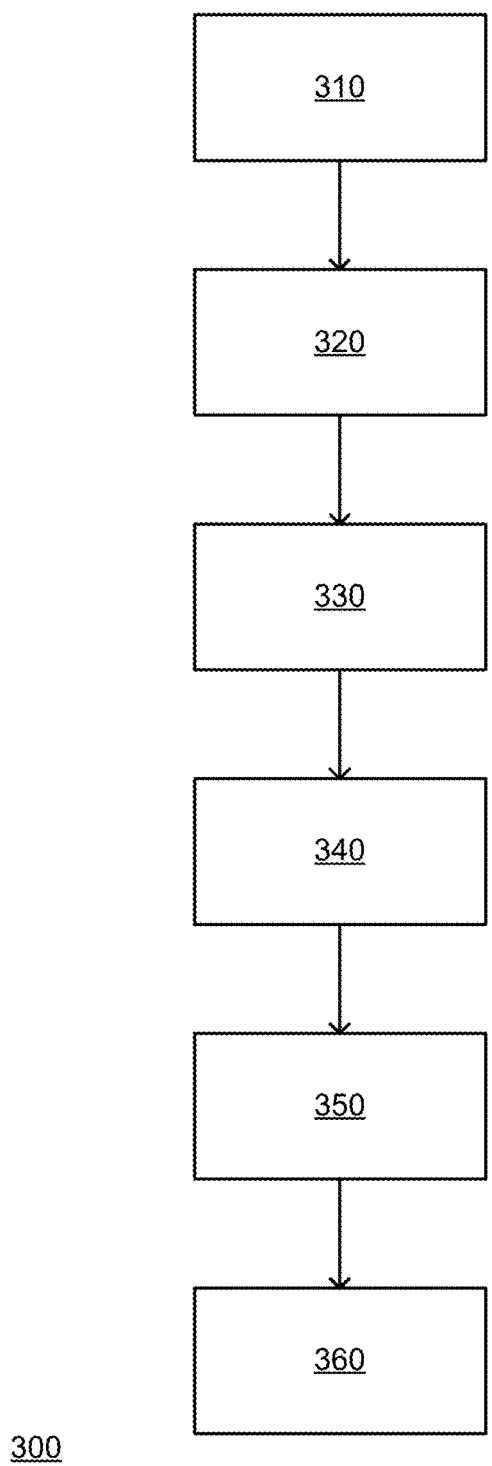
FIG. 1 illustrates an example of a method.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer-readable medium that stores instructions that once executed by a computer result in the execution of the method.

Any reference in the specification to a system should be applied mutatis mutandis to a method that can be executed by the system and should be applied mutatis mutandis to a non-transitory computer-readable medium that stores instructions that can be executed by the system.

Any reference in the specification to a non-transitory computer-readable medium should be applied mutatis mutandis to a system capable of executing the instructions stored in the non-transitory computer-readable medium and should be applied mutatis mutandis to method that can be executed by a computer that reads the instructions stored in the non-transitory computer-readable medium.

There may be provided a system, method and a computer-readable medium for using multiple detection channels in combination with a high-dimensional analysis of data acquired from the multiple detection channels. The suggested method takes into account much more information from the interaction of the electromagnetic field and the wafer, with a significant benefit to detection. An improvement of at least seventy percent was acquired using the listed below method.

FIG. 1 illustrates an example of method 300.

Method 300 may include steps 310, 320, 330, 340, 350 and 360.

Method 300 may start by step 310 of obtaining, by an imager, multiple images of the region. The region may include multiple region pixels.

An imager is a module or unit that is configured to acquire the multiple images.

The imager may be configured to illuminate the region with radiation, collect radiation from the region and detect the collected radiation from the sample. The imager may include optics, an image processor and may include multiple detectors.

Step 310 may include illuminating a region of a sample, collecting radiation from the region and detecting the collected radiation from the sample.

The radiation may be ultraviolet (UV) radiation, deep UV radiation, extreme UV radiation or any other type of radiation.

It is assumed that a single radiation beam may scan the region—but it should be noted that multiple radiation beams may scan multiple regions simultaneously.

The multiple images differ from each other by at least one parameter selected out of (i) illumination spectrum (which is the spectral response of an illumination portion of the imager), collection spectrum (which is the spectral response of a collection portion of the imager), illumination polarization (which is the polarization imposed by the illumination portion of the imager), collection polarization (which is the polarization imposed by the collection portion of the imager), angle of illumination (angle of illumination of the region by the illumination portion of the imager), angle of collection, and a detection type (for example—detecting amplitude and/or detecting phase).

The imager may include multiple detectors for generating the multiple images. Different detectors may be allocated to detect radiation from different pupil segments of the multiple pupil segments—one detector per pupil segment. Each one of the multiple detectors may be located in a plane that is conjugate to the pupil plane. See, for example, detectors 70 that are located in a plane that is conjugate to pupil plane 26 of system 10 of FIG. 1.

The different pupil segments may not overlap, may completely non-overlap or only partially overlap. The pupil segments can be of equal shape and size but at least two pupil segments may differ from each other by shape and additionally or alternatively by size and/or a position on the exit pupil plane.

There may be more than four pupil segments.

The imager may include multiple detectors for generating the multiple images. Different detectors may be allocated to detect radiations of different combinations of (a) polarization and (b) different pupil segments of the multiple pupil segments. See, for example, detectors 70 are allocated to detect radiation of a first polarization from different pupil segments and detectors 70' are allocated to detect radiation of a second polarization from different pupil segments.

It should be noted that the pupil may not be segmented and each of the multiple detectors may be allocated to the entire pupil.

Step 310 may include obtaining the multiple images at the same point in time.

Alternatively, step 310 may include obtaining two or more of the multiple images at different points in time.

Step 320 may include receiving or generating multiple reference images. The reference images may be images obtained by imager of an area of the sample that differs from the region of the sample. The area and the region may not overlap (for example when performing die to die comparison), or may partially overlap (for example when performing cell to cell comparison). The reference images may be calculated in various manners—for example by processing computer-aided design (CAD) information of the region, by generating a golden reference, and the like.

It should be noted that one image of the multiple images may be used as a reference image of another image of the multiple images.

Using a reference image that is not another image of the multiple images may be beneficial—as it may provide more information about the region.

Step 330 may include generating, by the image processor, multiple difference images that represent differences between the multiple images and the multiple reference images.

Step 340 may include calculating a set of region pixel attributes for each region pixel of the multiple region pixels. The calculating may be based on pixels of the multiple difference images.

The set of pixel attributes of a region pixel may include data regarding the region pixel and neighbouring region pixels of the region pixel.

Step 350 may include calculating a set of noise attributes, based on multiple sets of region pixels attributes of the multiple region pixels.

Step 350 may include calculating a covariance matrix.

Step 350 may include:
a. Calculating for each region pixel, a set of covariance values that represent the covariance between different attributes of the set of region pixel attributes of the region pixel.
b. Calculating the covariance matrix based on multiple sets of covariance values of the multiple region pixels.

Step 360 may include determining for each region pixel, whether the region pixel represents a defect based on a relationship between the set of noise attributes and the set of region pixel attributes of the pixel.

Step 360 may also be responsive to a set of attributes of an actual defect, or to a set of attributes of an estimated defect. The estimated defect may be a model of the defect.

Step 360 may include:
a. Comparing, to a threshold, a product of a multiplication involving (i) a set of attributes of the region pixel, (ii) the covariance matrix, and (iii) a set of attributes of an actual noise or of an estimated noise.

Figure 2:
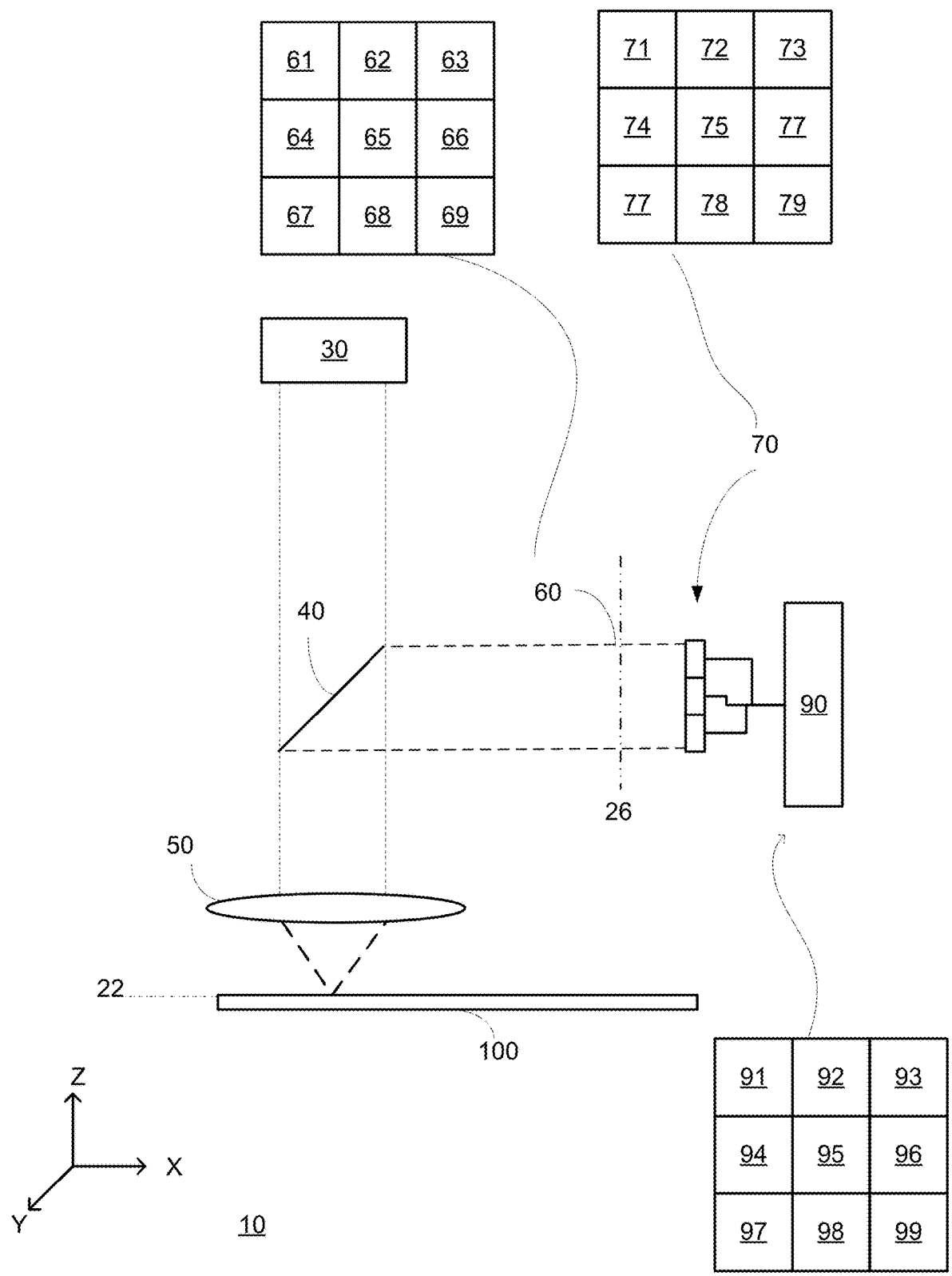
FIG. 2 illustrates an example of a system and a sample.

FIG. 2 illustrates an example of system 10 and sample 100.

FIG. 2 illustrates an allocation of nine detectors to nine pupil segments—one detector per pupil segment.

FIG. 2 also illustrates the pupil plane 26.

System 10 include radiation source 30, optics such as first beam splitter 40 and objective lens 50, detectors 70 and image processor 90.

The optics may include any combination of optical elements that may determine one or more optical properties (such as shape, size, polarization) of the radiation beam from radiation source 30, may determine the path of the radiation beam from radiation source 30, may determine one or more optical properties (such as shape, size, polarization) of one or more radiation beams scattered and/or reflected by the sample and determine the path of the one or more radiation beams—and direct the one or more radiation beams towards the detectors 70.

The optics may include lenses, grids, telescopes, beam splitters, polarizers, reflectors, deflectors, apertures, and the like.

In FIG. 2 the radiation beam from radiation source 30 passes through first beam splitter 40 and is focused by objective lens 50 onto a region of sample 22. Radiation beam from the region is collected by the objective lens 50 and reflected by first beam splitter 40 towards detector 70.

FIG. 2 illustrates a pupil 60 that is segmented to nine segments—first pupil segment 61, second pupil segment 62, third pupil segment 63, fourth pupil segment 64, fifth pupil segment 65, sixth pupil segment 66, seventh pupil segment 67, eighth pupil segment 68 and ninth pupil segment 69.

FIG. 2 illustrates detectors 70 as including nine detectors that are arranged in a 3×3 grid—the nine detectors include first detector 71, second detector 72, third detector 73, fourth detector 74, fifth detector 75, sixth detector 76, seventh detector 77, eighth detector 78 and ninth detector 79—one detector per pupil segment.

The nine image generate nine images that differ from each other—the images include first image 91, second image 92, third image 93, fourth image 94, fifth image 95, sixth image 96, seventh image 97, eighth image 98 and ninth image 99—one image per detector.

Figure 3:
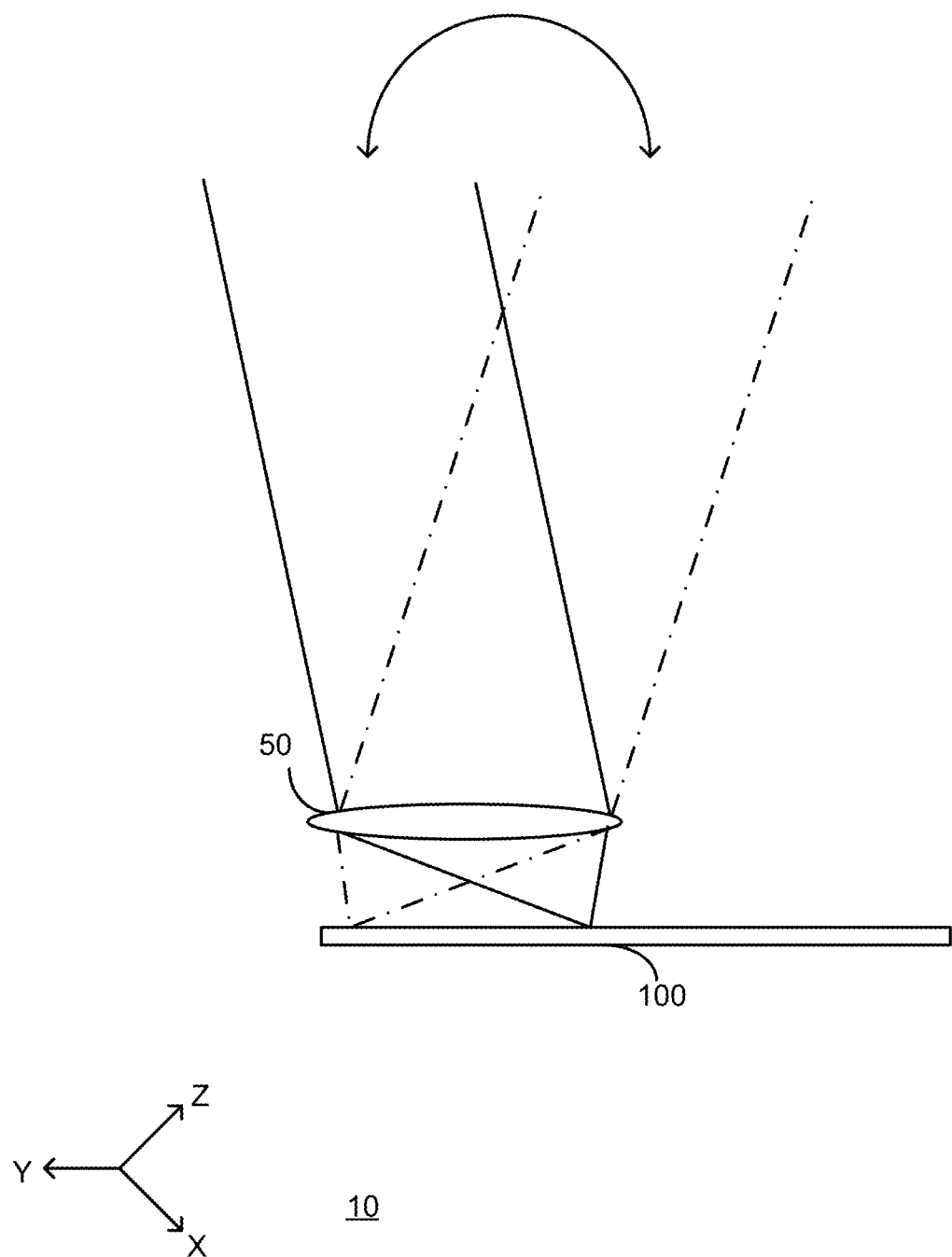
FIG. 3 illustrates an example of a scanning of a region of an object.

FIG. 3 illustrates a scanning of the region of the object along they axis. It is noted that the scanning can occur along any other axis.

Figure 4:
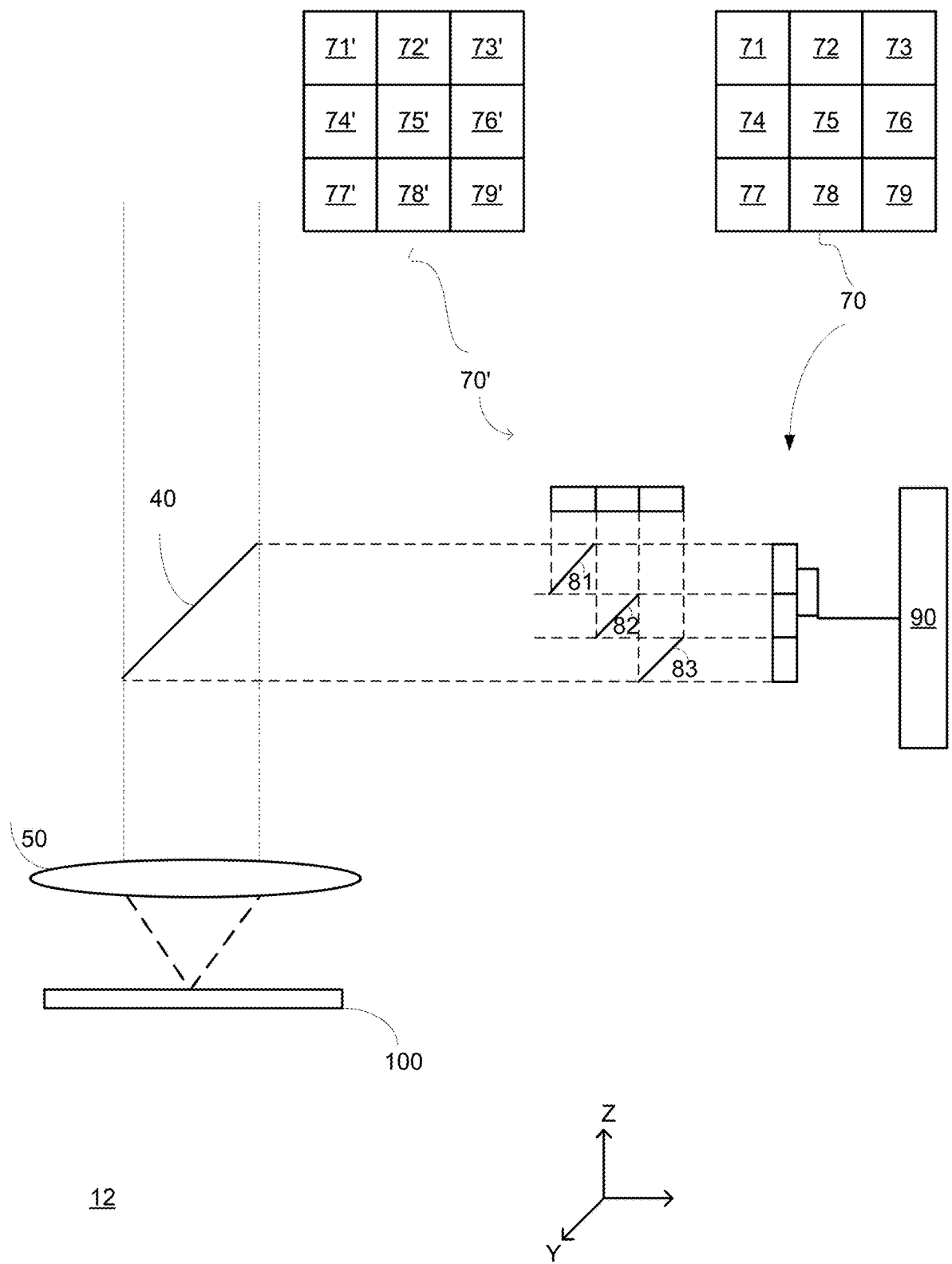
FIG. 4 illustrates an example of a system and a sample.

FIG. 4 illustrates system 12 that implements an allocation of eighteen detectors to nine pupil segments and to two polarizations—one detector per combination of pupil segment and polarization.

First detector till ninth detector 71-79 (collectively denoted 70) are allocated for a first polarization and for nine pupil segments.

Eighth detector till eighteenth detector 71', 72', 73', 74', 75', 76', 77', 78' and 79' (collectively denoted 70') are allocated for a second polarization and for nine pupil segments.

The different in the polarization aimed to detector 70 and to detectors 70' may be introduced using polarizing beam splitters and/or by inserting polarizing elements before the detectors. It should be noted that full characterization of polarization may require applying at least three different polarizations on each (and not just two)—thus additional polarizing elements and additional detectors should be added.

FIG. 4 illustrates a system 13 that includes a first polarizing beam splitter 81, a second polarizing beam splitter 82 and a third polarizing beam splitter 83.

Figure 5:
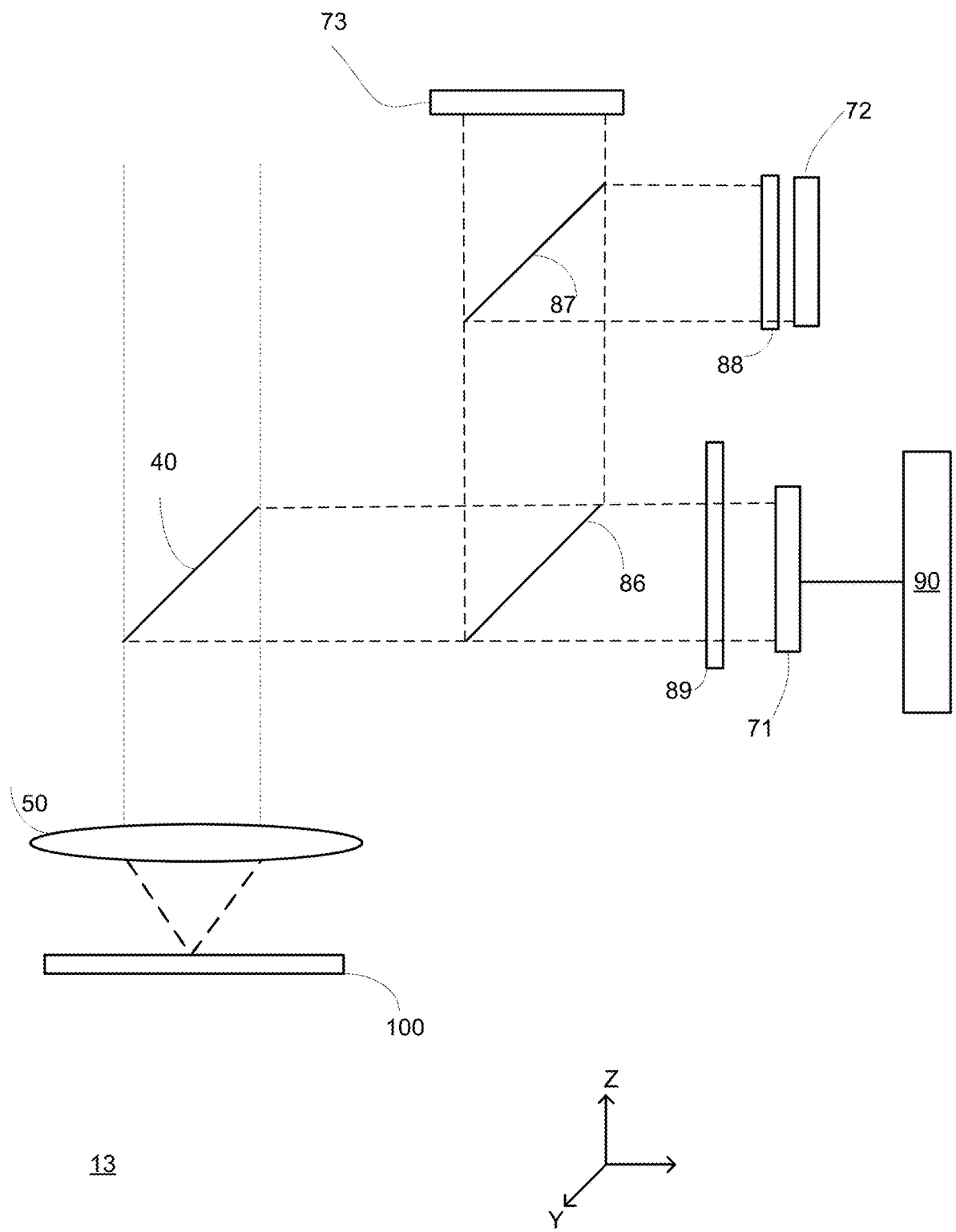
FIG. 5 illustrates an example of a system and a sample.

FIG. 5 illustrates a system 13 in which different detectors receive reflected radiation at different polarizations—due to the lack of a polarizer before third detector 73, the positioning of a first polarizer 89 before first detector 71 and the positioning of second polarized 88 before second detector. Each detectors out of first detector 71, second detector 72 and third detector 73 receives radiation from the entire pupil.

Figure 6:
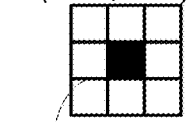
FIG. 6 illustrates an example of various images.

For simplicity of explanation the radiation source is not shown in FIG. 6.

The optics of system 13 includes, first beam splitter 40 and additional beam splitters (such as second beam splitter 86 and third beam splitter 87) for splitting the beam from the object between the first, second and third detectors.

In the following text it is assumed that there are nine different pupil segments, that nine difference images are calculated and that the neighbourhood of each pixel include eight pixels—so that the pixel and his neighbours include nine pixels. The number of pupil segments may differ from nine, the number of differential images may differ from nine, and the number of pixels neighbours may differ from eight.

Under these assumptions, each region pixel is represented by a vector of eighty-one elements and a covariance matrix include 81×81 elements. The number of elements per vector may differ from eighty-one, and the number of elements of the covariance matrix may differ from 81×81. For example—the number of pixel neighbours may differ by more than one then the number of difference images.

FIG. 6 illustrates first difference image 111, second difference image 112, third difference image 113, fourth difference image 114, fifth difference image 115, sixth difference image 116, seventh difference image 117, eighth difference image 118 and ninth difference image 119.

FIG. 6 also illustrates the (m,n)'th pixel of each of the nine difference images and its eight neighboring pixels—111(m−1,n−1) till 111(m+1,n+1), 112(m−1,n−1) till 112(m+1,n+1), 113(m−1,n−1) till 113(m+1,n+1), 114(m−1,n−1) till 114(m+1,n+1), 115(m−1,n−1) till 115(m+1,n+1), 116(m−1,n−1) till 116(m+1,n+1), 117(m−1,n−1) till 117(m+1,n+1), 118(m−1,n−1) till 118(m+1,n+1), and 119(m−1,n−1) till 119(m+1,n+1).

The nine difference images represent the same region of the wafer. Each location on the region (also referred to as a region pixel) is associated with nine pixels of the nine difference images—that are located at the same location within the respective difference images.

A (m,n)'th region pixel may be represented by a vector (Vdata(m,n)) that includes values (such as intensity) related to the (m,n)'th pixels of each of the nine difference images and to values related to the neighboring pixels of the (m,n)'th pixels of each of the nine difference images.

For example—for the (m,n)'th region pixel the vector (Vdata(m,n)) may include the following eighty one vector elements—I[111(m−1,n−1)] . . . I[111(m+1,n+1)], I[112(m−1,n−1)] . . . I[112(m+1,n+1)]I, I[113(m−1,n−1)] . . . I[113(m+1,n+1)], I[114(m−1,n−1)] . . . I[114(m+1,n+1)], I[115(m−1,n−1)] . . . I[115(m+1,n+1)], I[116(m−1,n−1)] . . . I[116(m+1,n+1)], I[117(m−1,n−1)] . . . I[117(m+1,n+1)], I[118(m−1,n−1)] . . . I[118(m+1,n+1)], and I[119(m−1,n−1)] . . . I[119(m+1,n+1)].

The noise may be estimated by a covariance matrix. The covariance matrix may be calculated by: (a) for each region pixel calculating all the possible multiplications between pairs of vector elements—thus for eighty one vector elements of each vector there are 81×81 multiplications, (b) summing corresponding products for all of the region pixels, and (c) normalizing the sums to provide the covariance matrix.

The normalizing may include averaging the sums.

For example—the first eighty one multiplications of step (a) may include multiplying I[111(m−1,n−1)] by all elements of V(m,n), and the last eighty one multiplications of step (a) may include multiplying I[119(m+1,n+1)] by all elements of V(m,n).

Assuming that there are M×N region pixels (and M×N pixels per each difference image) than step (a) includes calculating M×N×81×81 products. Step (b) includes performing, generating 81×81 sums—each sum is of M×N elements, and step (c) include normalizing the 81×81 sums—for example by calculating an average—dividing each sum by nine.

Assuming that a defect is known or estimated—the defect may be represented by a defect vector (Vdefect) of eighty one elements.

The decision of whether a region pixel includes a defect may include calculating the relationship (such as ratio) between the probability that the region pixel (represented by vector Vdata) was obtained by a defect to the probability that the region pixel (represented by vector Vdata) was not obtained by due to a defect.

A decision, per region pixel, of whether the region pixel is defective may include comparing a product involving $Vdefect^T$, the covariance matrix and Vdata to a threshold TH. If the product exceeds TH then it is determined that the region pixel represents a defect else it is assumed that the region pixel does not include a defect.

Other decision can be made, the threshold may be calculated in any manner, may be fixed, may change over time, and the like. The same threshold may be applied for all region pixels—but this is not necessarily so and different thresholds may be calculated for different region pixels. Differences in thresholds may result, for example from non-uniformity in the optics, aberrations, and the like different parts in the die may have different properties too and require different threshold.

FIG. 7 illustrates first difference image 111, second difference image 112, third difference image 113, fourth difference image 114, fifth difference image 115, sixth difference image 116, seventh difference image 117, eighth difference image 118 and ninth difference image 119.

FIG. 7 also illustrates first reference image 101, second reference image 102, third reference image 103, fourth reference image 104, fifth reference image 105, sixth reference image 106, seventh reference image 107, eighth reference image 108 and ninth reference image 109.

FIG. 7 further illustrates nine images acquired by nine detector—the nine images (also referred to acquired images) include first image 91, second image 92, third image 93, fourth image 94, fifth image 95, sixth image 96, seventh image 97, eighth image 98 and ninth image 99.

First difference image 111 represents the difference between first image 91 and first reference image 101.

Second difference image 112 represents the difference between second image 92 and second reference image 102.

Third difference image 113 represents the difference between third image 93 and third reference image 103.

Fourth difference image 114 represents the difference between fourth image 94 and fourth reference image 104.

Fifth difference image 115 represents the difference between fifth image 95 and fifth reference image 105.

Sixth difference image 116 represents the difference between sixth image 96 and sixth reference image 106.

Seventh difference image 117 represents the difference between seventh image 97 and seventh reference image 107.

Eighth difference image 118 represents the difference between eighth image 98 and eighth reference image 108.

Ninth difference image 119 represents the difference between ninth image 99 and ninth reference image 109.

Figure 8:
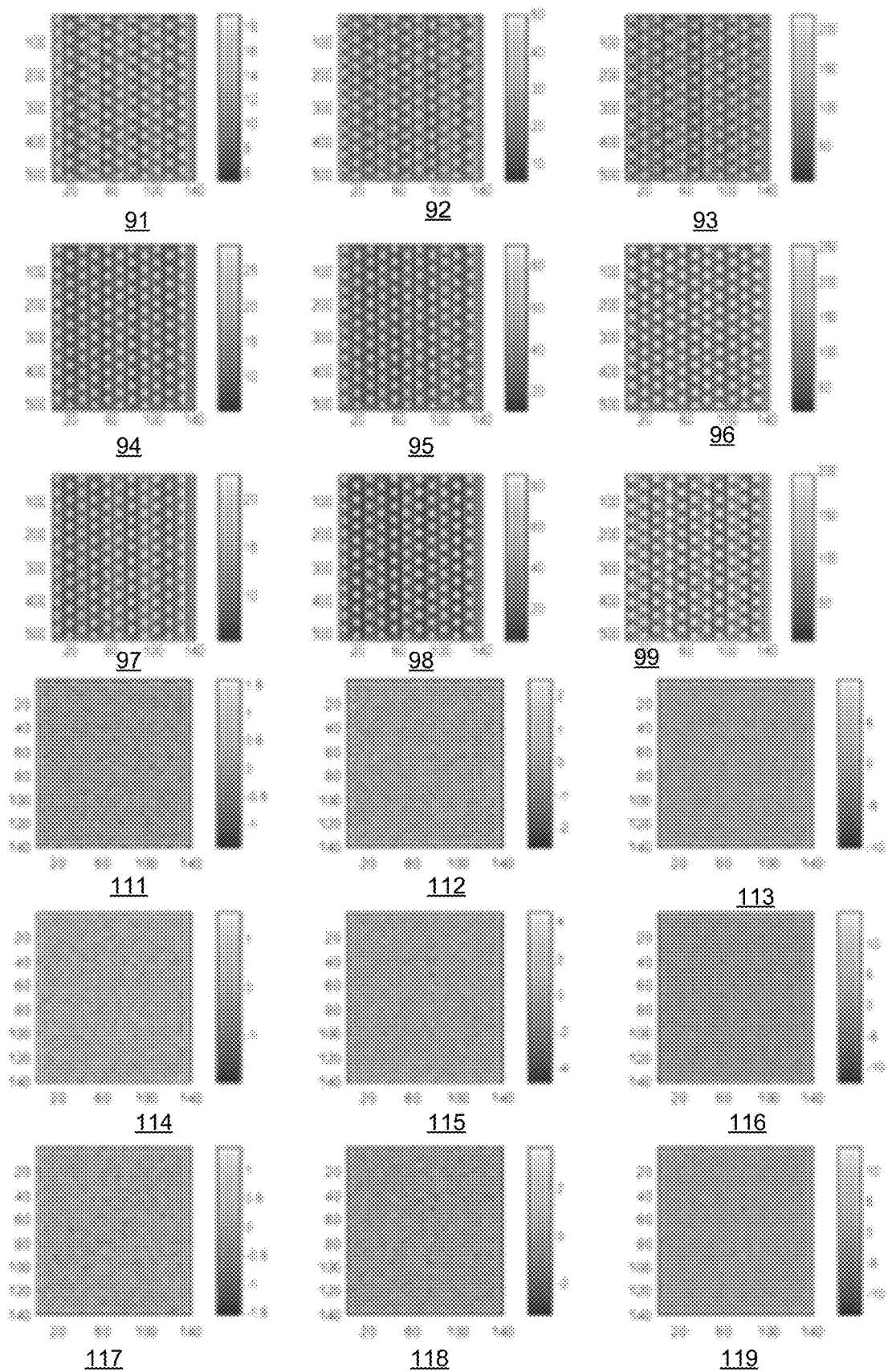
FIG. 8 illustrates an example of various images.

FIG. 8 is an example of first difference image 111, second difference image 112, third difference image 113, fourth difference image 114, fifth difference image 115, sixth difference image 116, seventh difference image 117, eighth difference image 118, ninth difference image 119, first image 91, second image 92, third image 93, fourth image 94, fifth image 95, sixth image 96, seventh image 97, eighth image 98 and ninth image 99.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer-readable medium. All or some of the computer program may be provided on computer-readable media permanently, removably or remotely coupled to an information processing system. The computer-readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for obtaining information about a region of a sample, the method comprises:
    obtaining, by an imager, multiple images of the region; wherein the multiple images differ from each other by at least one parameter selected out of illumination spectrum, collection spectrum, illumination polarization, collection polarization, angle of illumination, angle of collection, and sensing type; wherein the obtaining of the multiple images comprises illuminating the region and collecting radiation from the region; wherein the region comprises multiple region pixels;
    receiving or generating multiple reference images;
    generating, by an image processor, multiple difference images that represent differences between the multiple images and the multiple reference images;
    calculating a set of region pixel attributes for each region pixel of the multiple region pixels; wherein the calculating is based on pixels of the multiple difference images;
    calculating a set of noise attributes, based on multiple sets of region pixels attributes of the multiple region pixels; and
    determining for each region pixel, whether the region pixel represents a defect of interest, based on a relationship between the set of noise attributes and the set of region pixel attributes of the pixel;
    wherein calculating the set of noise attributes by calculating a covariance matrix; and, wherein the calculating of the covariance matrix comprises: calculating, for each region pixel, a set of covariance values that represent the covariance between different attributes of the set of region pixel attributes of the region pixel; and calculating the given covariance matrix based on multiple sets of covariance values of the multiple region pixels.

2. The method according to claim 1 wherein determining whether the region pixel represents a defect of interest is also responsive to a set of attributes of an actual defect.

3. The method according to claim 1 wherein determining whether the region pixel represents a defect of interest is also responsive to a set of attributes of an estimated defect.

4. The method according to claim 1, wherein the set of pixel attributes of a region pixel comprises data regarding the region pixel and neighboring region pixels of the region pixel.

5. The method according to claim 1, wherein the imager comprises multiple detectors for generating the multiple images, and wherein the method comprises allocating different detectors to detect radiation from different pupil segments of multiple pupil segments.

6. The method according to claim 5, wherein a number of the different pupil segments of the multiple pupil segments exceeds four pupil segments.

7. The method according to claim 1, wherein the imager comprises multiple detectors for generating the multiple images, and wherein the method comprises allocating different detectors to detect radiation from different combinations of (a) polarization and (b) different pupil segments of multiple pupil segments.

8. The method according to claim 1, further comprising obtaining the multiple images at a same point in time.

9. The method according to claim 1, further comprising obtaining the multiple images at different points in time.

10. The method according to claim 1, further comprising classifying the defect of interest.

11. A computerized system for obtaining information about a region of a sample, the system comprises:
    an imager that comprises optical elements and an image processor;
    wherein the imager is configured to obtain multiple images of the region; wherein the multiple images differ from each other by at least one parameter selected out of illumination spectrum, collection spectrum, illumination polarization, collection polarization, angle of illumination, and angle of collection; wherein the obtaining of the multiple images comprises illuminating the region and collecting radiation from the region; wherein the region comprises multiple region pixels;
    wherein the computerized system is configured to receive or generate multiple reference images;
    wherein the image processor is configured to:
        generate multiple difference images that represent differences between the multiple images and the multiple reference images;
        calculate a set of region pixel attributes for each region pixel of the multiple region pixels; wherein the set of region pixel attributes are calculated based on pixels of the multiple difference images;
        calculate a set of noise attributes, based on multiple sets of region pixels attributes of the multiple region pixels; and
        determine, for each region pixel, whether the region pixel represents a defect of interest, based on a relationship between the set of noise attributes and the set of region pixel attributes of the pixel,
        wherein calculating the set of noise attributes by calculating a covariance matrix; and, wherein the calculating of the covariance matrix comprises:
    calculating, for each region pixel, a set of covariance values that represent the covariance between different attributes of the set of region pixel attributes of the region pixel; and calculating the given covariance matrix based on multiple sets of covariance values of the multiple region pixels.

12. A non-transitory computer-readable medium that stores instructions that cause a computerized system to:
obtain, by an imager of the computerized system, multiple images of a region of an object; wherein the multiple images differ from each other by at least one parameter selected out of illumination spectrum, collection spectrum, illumination polarization, collection polarization, angle of illumination, angle of collection, and sensing type; wherein the obtaining of the multiple images comprises illuminating the region and collecting radiation from the region; wherein the region comprises multiple region pixels;
receive or generate multiple reference images;
generate, by an image processor of the computerized system, multiple difference images that represent differences between the multiple images and the multiple reference images;
calculate a set of region pixel attributes for each region pixel of the multiple region pixels; wherein the calculating is based on pixels of the multiple difference images;
calculate a set of noise attributes, based on multiple sets of region pixels attributes of the multiple region pixels; and
determine, for each region pixel, whether the region pixel represents a defect of interest, based on a relationship between the set of noise attributes and the set of region pixel attributes of the pixel,
wherein calculating the set of noise attributes by calculating a covariance matrix; and, wherein the calculating of the covariance matrix comprises: calculating, for each region pixel, a set of covariance values that represent the covariance between different attributes of the set of region pixel attributes of the region pixel; and calculating the given covariance matrix based on multiple sets of covariance values of the multiple region pixels.

13. The system according to claim 11, wherein determining whether the region pixel represents a defect of interest is also responsive to a set of attributes of an actual defect.

14. The system according to claim 11, wherein determining whether the region pixel represents a defect of interest is also responsive to a set of attributes of an estimated defect.

15. The system according to claim 11, wherein the set of pixel attributes of a region pixel comprises data regarding the region pixel and neighboring region pixels of the region pixel.

16. The non-transitory computer-readable medium according to claim 12, wherein determining whether the region pixel represents a defect of interest is also responsive to a set of attributes of an actual defect.

17. The non-transitory computer-readable medium according to claim 12, wherein determining whether the region pixel represents a defect of interest is also responsive to a set of attributes of an estimated defect.

18. The non-transitory computer-readable medium according to claim 12, wherein the set of pixel attributes of a region pixel comprises data regarding the region pixel and neighboring region pixels of the region pixel.

* * * * *